March 22, 1966 K. STANILAND ETAL 3,241,875
BUMPER HAVING ELASTOMERIC SHOCK ABSORBER
Filed Oct. 1, 1963 2 Sheets-Sheet 1

INVENTORS
KENNETH STANILAND
JOHN VICTOR VINT
BY
THEIR ATTORNEY 3,241,875
BUMPER HAVING ELASTOMERIC
SHOCK ABSORBER
Kenneth Staniland, Bradway, Sheffield, and John Victor
Vint, Sheffield, England, assignors to Davy and United
Engineering Company Limited
Filed Oct. 1, 1963, Ser. No. 313,068
Claims priority, application Great Britain, Oct. 2, 1962,
37,305/62
3 Claims. (Cl. 293—88)

This invention relates to bumpers and in particular to bumpers for use in plate mills to arrest the motion of slabs discharged from furnace chutes.

Plate mill bumpers are subject to considerable shock loads when the slabs strike the bumper heads. We have found that, at the moment of impact of the slab with the head, acutely high stress waves travel along the length of the head. In the past, these stress waves have given rise to fractures in welds in the bumper heads, the bumper beams and in the ancillary shock-absorbing equipment of the bumpers.

In accordance with one aspect the present invention provides, a bumper having a head carried by a shock absorbing unit, the head being supplied with a resilient pad to temporarily absorb impact energy transmitted to the bumper by an object striking it.

In accordance with another aspect the invention provides a bumper having a head unit supplied by a shock absorbing unit and comprising a bumper beam, a detachable steel element carried by the beam in front thereof, but movable with respect thereto, and impact energy absorbing means located between the element and the beam to temporarily absorb the impact load.

Another aspect of the present invention resides in an improvement in or modification of the invention of our copending British Patent No. 942,313 (U.S. Patent No. 3,143,337) in which each bumper section, as claimed in that application, has on its bumper head at least one impact-receiving pad.

The invention will be more readily understood by way of example from the following description of a bumper head in accordance therewith, reference being made to the accompanying drawings, in which.

Figure 3:
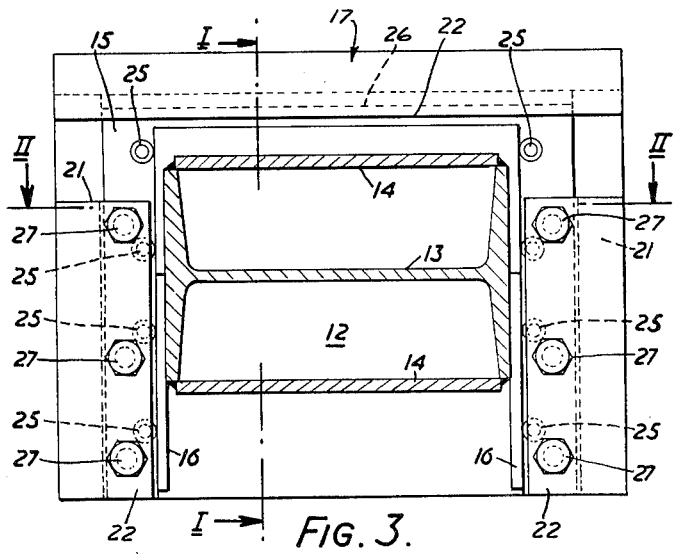
FIGURE 3 is a section on the line III—III of FIGURE 2.

The bumper column 12 shown in the drawing corresponds with one of the bumper beams A, B or C of British Patent No. 942,313 and is associated with shock-absorbing means, such as those described in that specification. As shown in FIGURE 3, the column consists of a universal beam 13 and steel plates 14 welded across the flanges of the beam 13.

To the forward end of the column 12 is welded a bumper beam 15, consisting in this case of a flat 2½-inch-thick steel plate. The attachment of the beam 15 to the column 12 is reinforced by reinforcing plates 16.

The bumper beam 15 is supplied with a detachable head 17 and two resilient pads, shown generally at 18, in order to lower the peak loads received by the beam 15 on the bumped being struck by a slab, as above explained.

Figure 4:
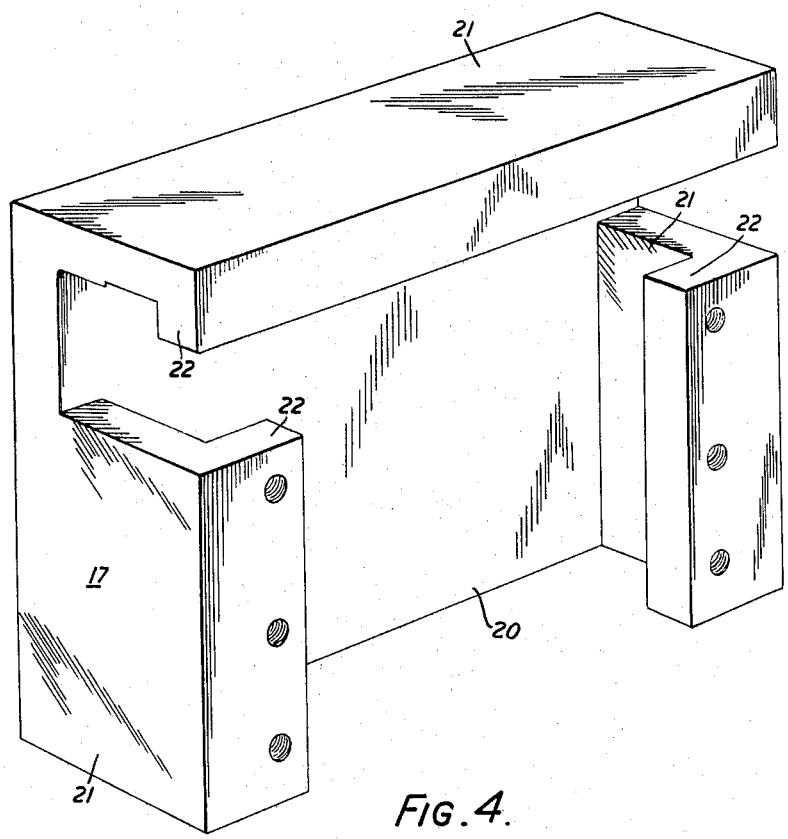
FIGURE 4 is a perspective view of the head alone.

The head 17 comprises a central plate 20, to the top, and two sides of which are welded edge pieces 21, each formed with integral lugs 22 which extend behind the bumper beam 15 on three sides thereof (see FIGURE 4). Each of the resilient pads 18 comprises two steel plates 23 between which is bonded a rubber pad 30. Interposed between the plate 20 of the head 17 and the forward plates 23 is a heat resisting gasket 24.

Figure 1:
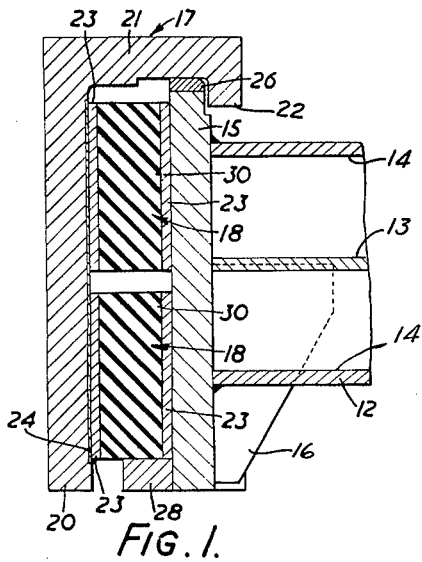
FIGURE 1 is a sectional elevational view taken on lines I—I of FIGURE 3.
Figure 2:
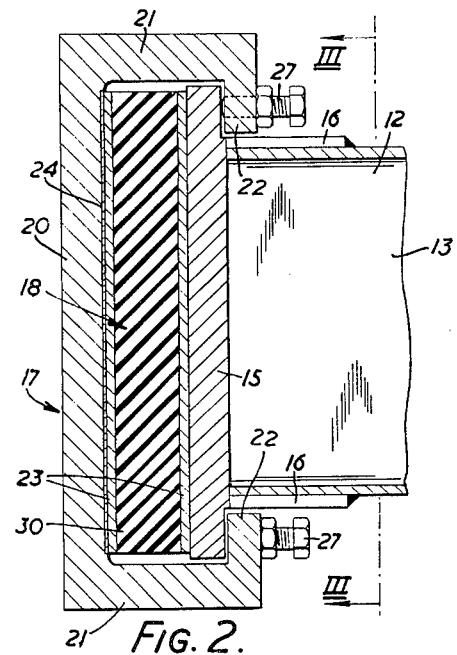
FIGURE 2 is a sectional plan view taken on lines II—II of FIGURE 3.

During assembly, the pads 18 are first attached to the bumper beam 15 by set screws located at positions 25 as indicated in FIGURE 3. A brass wearing strip 26 shown in FIGURE 1 is fitted to the top edge of the beam 15. The gasket 24 is fixed to the head 17 which is then lowered on to the beam 15 and the pads 18 to the position indicated in FIGURE 1. Set screws (not shown) are then fitted to secure the head 17 to the forward plates 23 of the pads 18 but allows relative movement between the pads and head. Finally, the pads 18 are preloaded by the use of six set screws, two of which are shown at 27 in FIGURE 2, and which pass through the side lugs 22 of the head 17 and bear against the rear face of the bumper beam 15. A stop 28, welded to the beam 15, limits the downward travel of the pad 18.

In operation, a part of the shock load applied to the head 17 by a slab is temporarily absorbed by the rubber pads bonded to the steel plates 23, with the result that the loads are transmitted to the bumper beam 15 over a longer period of time than would otherwise be the case. The lugs 22 located at the rear of the beam 15 restrain the movement of the head 17 on the recoil of the pad 18. The lugs 22 also restrain movement of the top of the head 17 to the left, in FIGURE 1 of the drawings, when the bumper is struck by a slab having a height somewhat less than half the height of the head 17. The pad 18 is designed to absorb temporarily an impact energy blow of 40 inch-tons, the blow being delivered at any point of the face of the head 17. This is sufficient to withstand without fracture an 18-ton slab, striking the bumper while travelling at a speed of 10 feet per second.

It will be appreciated that, whereas the head 17 as shown and described is a welded fabrication, it may conveniently be made as a one-piece casting.

In accordance with the provisions of the patent statutes, we have explained the principle and operation of our invention and have illustrated and described what we consider to represent the best embodiment thereof. However, we desire to have it understood that within the scope of the appended claims, the invention may be practiced otherwise than as specifically illustrated and described.

We claim:
1. A bumper comprising
 (a) a beam attached to a column that ultimately receives impact loads,
 (b) said beam having portions on its two sides extending beyond the column,
 (c) a resilient member secured to said beam arranged to temporarily absorb the impact loads,
 (d) an impact striking element having a surface for receiving the impact loads, and

(e) said elements having on its side opposite said surface two portions including lips that enclose the extending portions of said beam and a third portion including a lip that encloses one of the other sides of said beam.

2. A bumper according to claim 1 including a heat resilient element between the impact striking element for said resilient element.

3. A bumper according to claim 1 including means carried by said element engageable with said beam for urging said beam and resilient member against said element.

References Cited by the Examiner

UNITED STATES PATENTS

| | | | |
|---|---|---|---|
| 959,232 | 5/1910 | Lane | 293—85 X |
| 1,438,177 | 12/1922 | Hatashita | 293—86 |
| 2,100,065 | 11/1937 | Buckwalter | 267—63 X |
| 2,113,372 | 4/1938 | Ellies | 267—63 |
| 2,251,347 | 8/1941 | Williams et al. | 213—221 |

ARTHUR L. LA POINT, *Primary Examiner.*

MILTON BUCHLER, *Examiner.*